LE ROY CLARK.
COUPLING CONNECTOR FOR SUBMARINE CABLES.
APPLICATION FILED SEPT. 19, 1914.
1,152,005.
Patented Aug. 31, 1915.
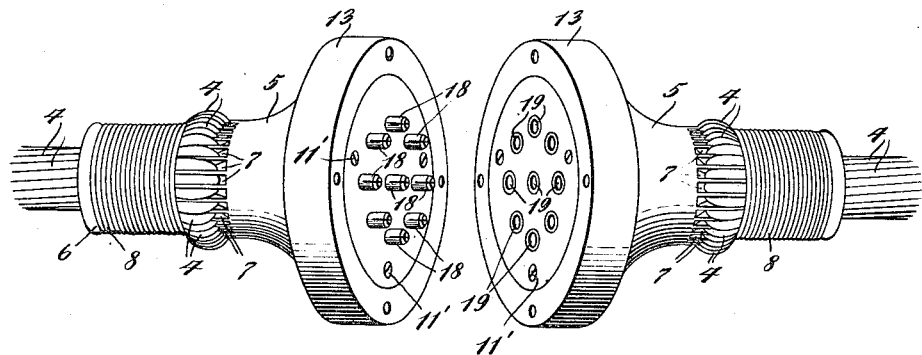
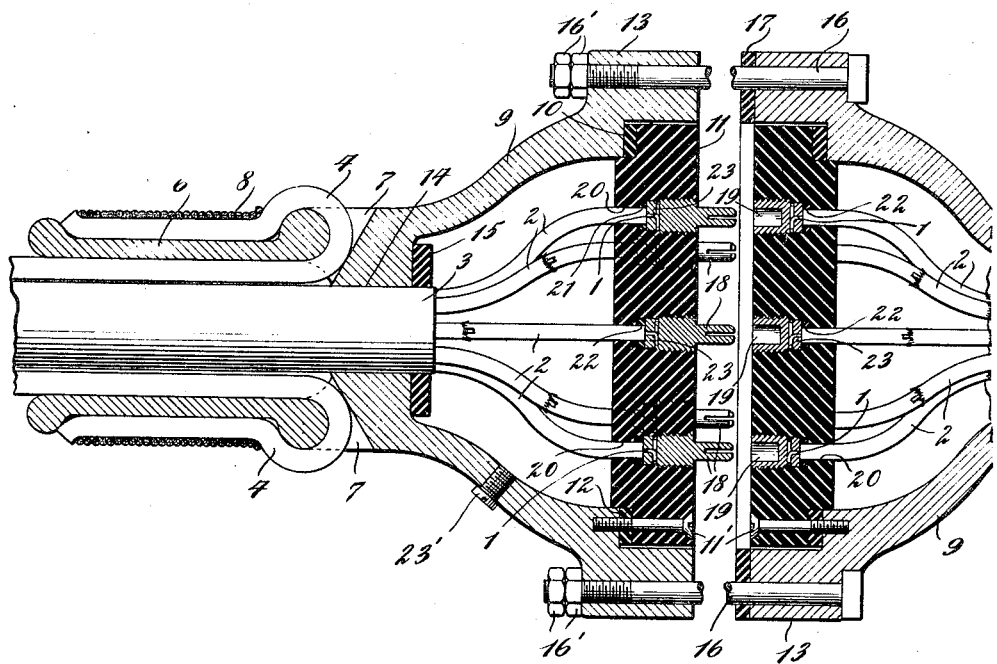
Witnesses:
Inventor
Le Roy Clark
By his Attorneys

UNITED STATES PATENT OFFICE.

LE ROY CLARK, OF ENGLEWOOD, NEW JERSEY.

COUPLING-CONNECTOR FOR SUBMARINE CABLES.

1,152,005.   Specification of Letters Patent.   Patented Aug. 31, 1915.

Application filed September 19, 1914. Serial No. 862,435.

*To all whom it may concern:*

Be it known that I, LE ROY CLARK, a citizen of the United States, residing at Englewood, in the county of Bergen and State of New Jersey, have invented certain new and useful Improvements in Coupling-Connectors for Submarine Cables, of which the following is a full, clear, and exact description.

This invention relates to connectors for electrical conductors and more specifically to the type of connector which is adapted to mechanically couple two cable lengths together, and to also electrically connect the ends of the conductors forming the cable.

Heretofore it has been the general, if not the invariable practice in coupling the ends of two cable lengths together, and especially armored sub-marine cables, to splice the respective conductor ends and secure the cable lengths together by an additional coupling which surrounds the spliced ends of the cables and forms a water proof housing for the same. In certain fields of industry as where sub-marine cables are used to connect a series of explosive mines to a central control point, the speed and rapidity with which the cable can be laid and the mines planted, is of the greatest importance since such cables are frequently laid under circumstances which would render any delay dangerous. To therefore avoid a joint in the cable wherever possible and the corresponding delay which occurs in splicing each pair of conductor ends together while the cable is being laid, it has been the common practice to reduce the diameter of the cable even at the expense of the greater mechanical strength and insulating properties which a cable of a larger diameter would have, so that longer single lengths of cable may be procured without making them too cumbersome to handle.

The aim of the present invention is therefore to provide a joint or connection for cables of this character which may be effected in a simple and expeditious manner and which at the same time will be water proof, and possess the necessary strength to prevent the cable from parting or breaking at the joint.

Accordingly, the invention therefore consists of two complementary coupling members which are permanently secured to the ends of the respective lengths of cable which are to be joined together before it is desired to lay the cable. These coupling members are attached directly to the wire strands forming the armor of the cable so that a connection is provided of the requisite strength to sustain the tensile strains without any danger of the coupling member pulling free from the end of the cable, the coupling members when joined together forming a joint which is water-tight and so preventing the water from attacking the insulation or the wires which form the cable.

The invention also consists in combination with coupling members of this character of a plurality of complementary connector terminals which are so disposed upon each member of the coupling, that when these members are united, the connectors will automatically co-act with each other to electrically connect the wires forming the cable, the construction by which the connector terminals are mounted on the coupling members forming an important feature of the invention.

In the accompanying drawings: Figure 1 shows in perspective a pair of disconnected complementary connectors embodying the features of the invention; and Fig. 2 shows a central longitudinal section through the connectors, the same being shown partially connected together.

In the drawings, the coupling members are shown associated with a common form of wire armored sub-marine cable which comprises a plurality of conductors 1, each of which is covered by a layer of insulation 2 such as rubber, gutta percha or the like. The plurality of conductors which form the cable are surrounded by several layers 3 of jute or other insulating material, while armor wires 4 give to the cable its requisite tensile strength. Complementary coupling members 5 are adapted to be secured to the respective ends of two cable lengths which are to be joined together. Each of these coupling members has a sleeve 6 which is adapted to fit over the end of the cable and is provided with a plurality of radially disposed openings 7 adjacent its inner end through which the armor wires 4 are adapted to pass. The armor wires are then bent down against the exterior surface of the sleeve to which they are bound by a serving wire 8, which gives a permanent connection capable of maintaining equal if not greater strains than the armor wire *per se* and which will also insure that there will be no liability or danger of the coupling member pulling free of the cable end even if it is subjected to heavy tensile strains.

Attached to the sleeve 6 and preferably integral with it, is a hollow bell-shaped head 9, which is arranged in axial alinement with the cable and extends out beyond the end of the same. This head has a substantially circular mouth or opening which is interiorly recessed to provide an annular seat or shoulder 10. A circular plate 11 of hard rubber fiber or like insulating material is fitted into this opening and has its face substantially flush with the outer annular surface of the head, the plate being removably secured in place against the shoulder 10 by bolts or screws 11', as will be hereinafter referred to. Preferably interposed between the abutting faces of the plate and shoulder is a gasket or washer 12 of soft rubber, which, when the plate is screwed down upon its seat, will render the joint water proof for all practical purposes. Surrounding the exterior of the head adjacent its mouth is an annular flange 13 which is provided with a plurality of bolt openings parallel to the axis of the coupling and the cable. The small end of the bell-shaped head is closed and provided with a central opening or aperture 14 of a size to permit the conductor cable to pass therethrough after it has been stripped of its armor wires, which cable fits snugly in the aperture thus provided to thereby prevent water from entering the interior of the head at this point. However, it is desirable to provide a rubber gasket 15 which is mounted on the extreme end of the cable and within the head so that when the coupling member is finally adjusted in place, the gasket will surround this joint and further protects it.

Bolts 16 pass through the bolt openings in flanges of the head and threaded upon the ends of the bolts are nuts 16', which serve to draw and rigidly secure the coupling members together. A rubber gasket or washer 17, is preferably interposed between the abutting faces of these members before these nuts are tightened, which will thereafter render this joint water-tight when the connection is completed.

Mounted on each of the plates 11 are a plurality of complementary connector terminals, each of which is adapted to be connected to one of the conductors of the cable. In the specific embodiment shown nine such connector terminals are shown on each head, but it is to be understood that a greater or less number may be provided, depending upon the number of wires forming the cable. These connector terminals may be of any of the well known type, and in the drawings, plug terminals 18 are shown mounted on the plate of one member, while upon the other plate, socket terminals 19 are disposed, which terminals are so spaced in relation to each other that when the coupling members are united, the plug terminals will enter the sockets to automatically connect the conductor wires of the cables together. Each of these terminals is rigidly mounted in the plate by a threaded portion thereof entering a similarly threaded aperture in the outer face of the plates. These terminals are each connected to a corresponding conductor cable by similar constructions so that a description of one such connection will suffice.

An aperture 20 is provided in the inner face of the plate 11 opposite a connector terminal, for example, one of the plug terminals 18, which aperture leads to a slightly larger cylindrically shaped recess or chamber 21 formed in the plate behind the terminal. The end of a conductor 1, together with its insulating covering 2, passes through the aperture 20 into the recess 21, in the bottom of which is seated a rubber gasket 22 which fits over the layer of insulation on the conductor and abuts against the bottom of the chamber to render the joint between the wire and the walls of the aperture 20 water-tight. The end of the conductor wire which projects beyond the gasket is stripped or bared of its insulation and passes through a central opening in a washer 23 of brass or other good conducting material, and then the end of the wire is curled and bent to abut against the rear end of the connector terminal. When the terminal is screwed down into place in the plate 11, the end of the wire is therefore held between the washer and the end of the conductor terminal, insuring good electrical contact at all times, between a conductor wire and its corresponding terminal. The interior of the head 9 may be filled with paraffin or some similar material, if desired, in order to further protect the conductors from any water which might leak into the coupling members, an opening closed by a screw plug 23' being provided for this purpose.

In placing a coupling member on the end of the cable, the head 9 is first slipped over the end of the cable and the armor wires 4 passed through the openings 7. The ends of the connector are then positioned within the apertures in the plate 11, after which the terminals are screwed down against the same, and then the plate 11 is secured in place in the mouth of the head, after the rubber gasket 15 has been placed in position. The armor wires are then bound against the sleeve 7 in the manner described, so that when it is desired to connect the ends of two cable lengths together it is only necessary to pass the connecting bolts 16 through their corresponding holes and tighten the nuts on the same, which connection may be made within a very short period of time; the plug terminals enter the corresponding sockets as the coupling members are drawn together, and if desired marks may be made on each of the coupling members to insure that a determined plug will enter a certain socket terminal in the other coupling member.

While I have shown the invention in connection with two complementary coupling members for the ends of two cable lengths, yet it is apparent that one of the members or heads may alone be used and used to connect distributing cables or wires to the cable in various ways, and it is my intention to limit the invention, only by the scope of the appended claims.

I claim—

1. In combination with a wire armored conductor cable, a terminal head having a sleeve fitting over the end of the cable, said sleeve having a plurality of openings therein through which said armor wires pass, and means for securing the ends of said armor wires to the exterior of said sleeve.

2. In combination with a wire armored conductor cable, a coupling member comprising a sleeve fitting the end of said cable, said sleeve having a plurality of openings therein through which said armor wires pass, means for securing the ends of said armor wires to the exterior of said sleeve, and a head attached to said sleeve having a complementary connector terminal mounted thereon and insulated therefrom, and means for securing one of the conductors of said cable to said terminal.

3. The combination with an armored cable of a coupling member fitting over the end of the cable and having a series of perforations through which the armor wires of the cable pass, means for securing the projecting ends of the armor wires exteriorly of the coupling member, the coupling member being provided with an insulating block in which the ends of the conducting wires of the cable are fixed.

4. In combination with a conductor cable, a terminal head secured thereto, said head comprising a bell shaped casing arranged in axial alinement with said cable and having an open end, a plate of insulating material removably secured in the open end of said casing, a connector terminal mounted on said plate having a portion thereof mounted in an aperture in said plate, one of the conductors of said cable passing through the other end of said aperture, and means for electrically connecting said wire to said connector terminal, said means comprising a washer positioned in said aperture through which the bared end of the conductor wire passes, said wire being bent to bear against the end of said connector terminal.

5. In combination with two wire armored cables, two coupling members having sleeves fitted over the ends of said cables, said sleeves having openings therein through which said armor wires pass, means for securing the ends of said wires against said sleeve, and means for securing said coupling members together.

In witness whereof, I subscribe my signature, in the presence of two witnesses.

LE ROY CLARK.

Witnesses:
 Geo. Wilson,
 Wm. R. Reid.